US012736658B2

(12) United States Patent
Govinda Kammath et al.

(10) Patent No.: US 12,736,658 B2
(45) Date of Patent: Sep. 15, 2026

(54) APPARATUS AND METHOD FOR TRACKING OBJECTS

(71) Applicant: Infineon Technologies AG, Neubiberg (DE)

(72) Inventors: Abhilash Govinda Kammath, Munich (DE); Reinhard-Wolfgang Jungmaier, Alkoven (AT)

(73) Assignee: Infineon Technologies AG, Neubiberg (DE)

( * ) Notice: Subject to any disclaimer, the term of this patent is extended or adjusted under 35 U.S.C. 154(b) by 234 days.

(21) Appl. No.: 18/418,918

(22) Filed: Jan. 22, 2024

(65) Prior Publication Data

US 2024/0255633 A1 Aug. 1, 2024

(30) Foreign Application Priority Data

Jan. 31, 2023 (EP) .................................... 23154328

(51) Int. Cl.
*G01S 13/72* (2006.01)

(52) U.S. Cl.
CPC .................................. *G01S 13/726* (2013.01)

(58) Field of Classification Search
CPC ..................................................... G01S 13/726
See application file for complete search history.

(56) References Cited

U.S. PATENT DOCUMENTS

2015/0309171 A1* 10/2015 Ishimori ........... B60W 30/0956 342/27
2021/0011147 A1* 1/2021 Va ........................... G01S 7/415
2021/0080557 A1* 3/2021 Vaishnav ................ G01S 13/72
2024/0053464 A1* 2/2024 Dahnoun .............. G01S 13/886

FOREIGN PATENT DOCUMENTS

CN 113450390 A 9/2021
EP 3792659 A1 3/2021

OTHER PUBLICATIONS

Anonymous, "Introduction to Multiple Target Tracking -MATLAB & Simulink-MathWorks Deutschland Introduction to Multiple Target Tracking Elements of an MTT System Introduction to Multiple Target Tracking—MATLAB & Simulink—MathWorks Deutschland", May 20, 2022, pp. 1-4, XP093048900.

* cited by examiner

*Primary Examiner* — Nazra Nur Waheed
(74) *Attorney, Agent, or Firm* — Slater Matsil, LLP

(57) ABSTRACT

An apparatus comprises processing circuitry is configured to receive at least one previous position of a previous target from a track data list; to determine whether a position of a target determined by a radar measurement is within a vicinity of the previous position; and replace the previous position with the position in the track data list in response to the position being within the vicinity of the previous position.

20 Claims, 4 Drawing Sheets

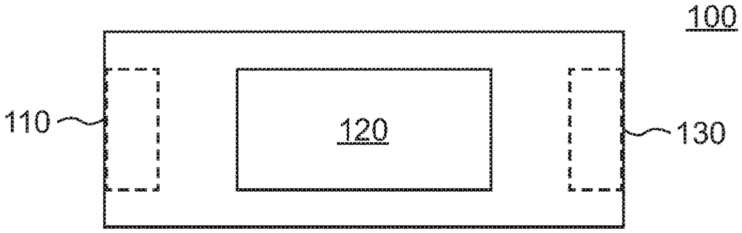

Current measurement target list

Track data containing target list informations from previous frames

Current measurement target list mapped to presence zone grid
231

233

Trackdata to Current measurement target list data association

Identify non associated targets

232

Update presence zone grid
234

230

235
Presence zone grid update with non associated targets 236
237

Clear presence zone grid members based on conditions

Generate presence flag

Update track data for next measurements
240

252
254
256

250
No. of active zones

No. of targets

Presence Flag

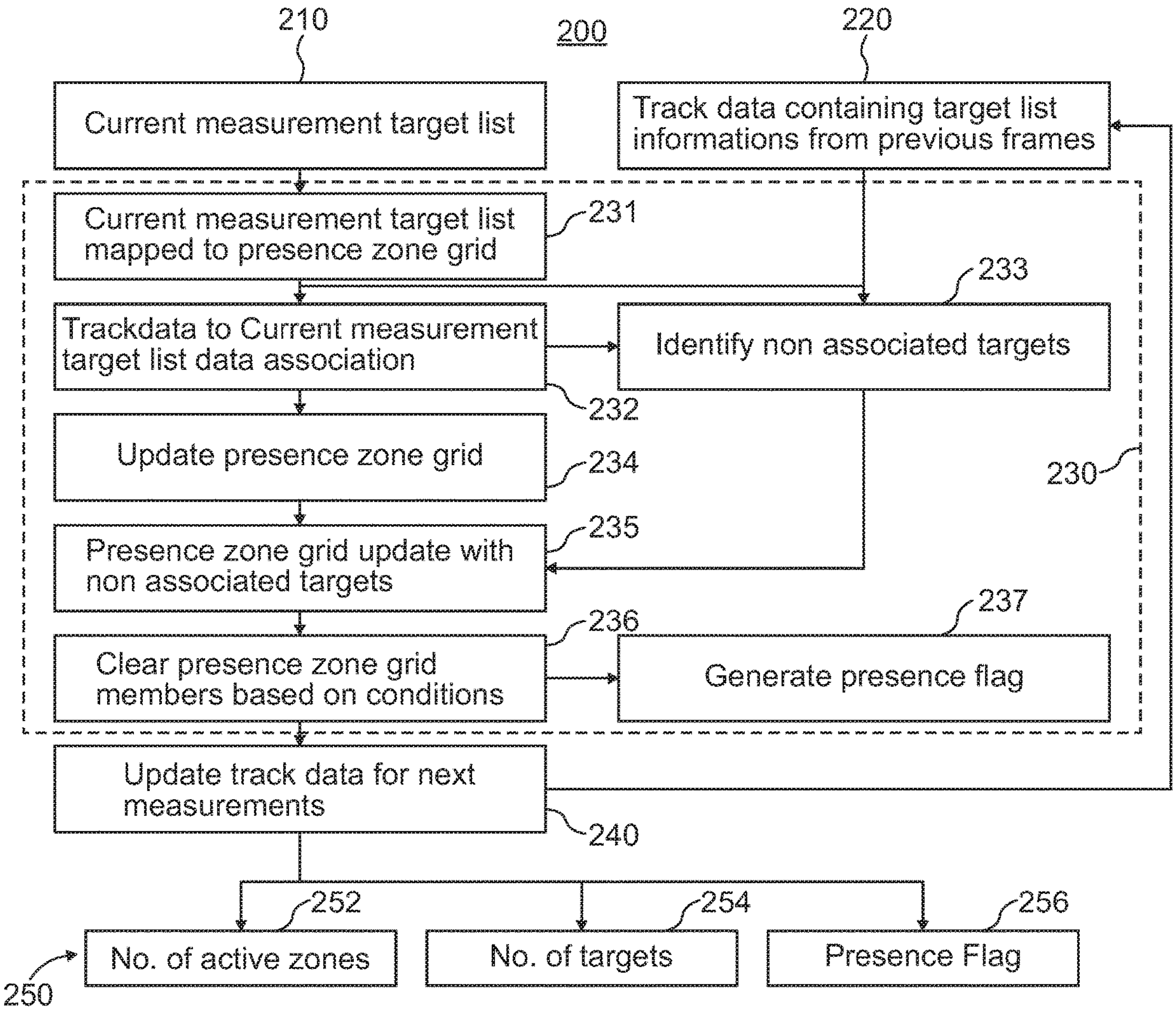

Fig. 2

APPARATUS AND METHOD FOR TRACKING OBJECTS

This application claims the benefit of European Patent Application No. 23/154,328, filed on Jan. 31, 2023, which application is hereby incorporated herein by reference.

TECHNICAL FIELD

Examples relate to an apparatus and method for tracking objects based on radar measurements.

BACKGROUND

Presence detection by means of radar devices is meant to detect the presence of objects in a scene, for example, determining the presence of people in an area of interest. Presence of moving objects in a static scene may be easier than detection of quasi-static or static objects that exhibit no movement on a macroscopic scale. Existing presence detection algorithms use, for example, micro motion of humans or other targets to detect quasi static targets. Another approach is to use highly sophisticated tracking algorithms to track target movements and to conclude on their presence once they become static in the scene, for example if a human enters a scene and sits down in a couch. Although costly in terms of computational complexity, micro motion-based target detection is susceptible to determine false targets, in particular slow moving targets like curtains, fans, cleaning robots and vibrations from the floor. Further, micro motion detection may store the Range Fast Fourier Transform (FFT) results of a certain number of radar chirps or the entire Range doppler FFT data of multiple frames, which in turn increases memory consumption and power usage. Tracking of targets to conclude on the presence of a target also when it is presently not moving is also a common approach. To date, tracking of people in a scene needs a reasonable number of detections per time interval. This may result in a relatively high frame rate of, for example, more than 10 Hz or in a high number of chirps which in turn increases power consumption and memory usage. Furthermore, suitable tracking algorithms rely on trained neural networks or on the use of sophisticated tracking filters like Kalman and its derivatives, which in turn increases energy consumption. Therefore, conventional approaches of presence detection may cause high energy consumption due to the computations required for reliable tracking or for micro movement estimation.

There is a demand for a more efficient approach to determine presence.

SUMMARY

An embodiment of an apparatus comprises processing circuitry configured to receive at least one previous position of a previous target from a track data list and to determine whether a position of a target determined by a radar measurement is within a vicinity of the previous position. The previous position is replaced by the position in the track data list if the position is within the vicinity of the previous position. The previous position of a previously determined target is so updated with the position within the track data list that can consequently be used for presence detection. The computations used to determine neighborhood are simple and can, consequently, be performed by low power devices, for example directly within radar devices.

Similar benefits are generated by an embodiment of a method to process data of a radar sensor that comprises receiving target information indicating a position of a target determined by a radar measurement as well as receiving at least one previous position of a previous target from a track data list. The method further comprises determining whether the position is within a vicinity of the previous position and replacing the previous position with the position in the track data list if the position is within the vicinity of the previous position.

BRIEF DESCRIPTION OF THE DRAWINGS

Some examples of apparatuses and/or methods will be described in the following by way of example only, and with reference to the accompanying figures, in which FIG. 1 an embodiment of an apparatus;

FIG. 2 a flow chart of an embodiment of a method to process data of a radar sensor;

DETAILED DESCRIPTION OF THE EMBODIMENT

Figure 3:
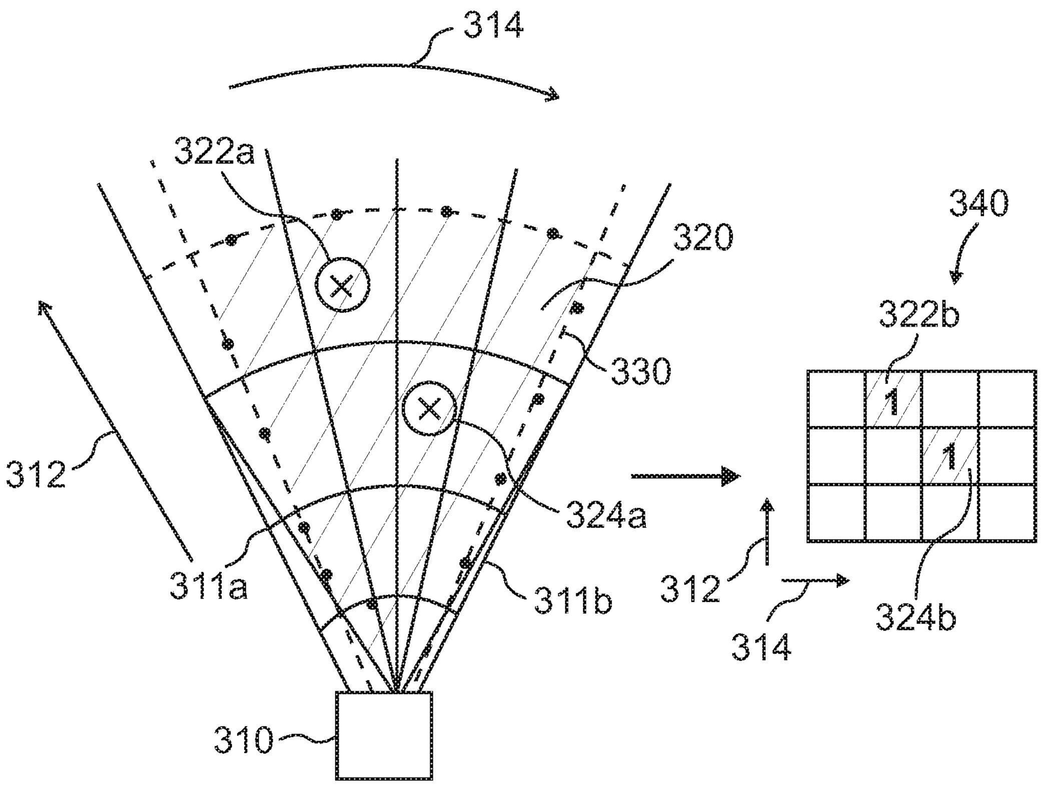
FIG. 3 a schematic illustration of a field of view of a radar sensor and targets identified therein.

Some embodiments are now described in more detail with reference to the enclosed figures. However, other possible examples are not limited to the features of these embodiments. Other examples may include modifications of the features as well as equivalents and alternatives to the features. Furthermore, the terminology used herein to describe certain examples should not be restrictive of further possible examples.

Throughout the description of the figures same or similar reference numerals refer to same or similar elements and/or features, which may be identical or implemented in a modified form while providing the same or a similar function. The thickness of lines, layers and/or areas in the figures may also be exaggerated for clarification.

When two elements A and B are combined using an "or", this is to be understood as disclosing all possible combinations, i.e. only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "including", "comprise" and/or "comprising", when used, describe the presence of the specified features, integers, steps, operations, processes, elements, components and/or a group thereof, but do not exclude the presence or addition of one or more other features, integers, steps, operations, processes, elements, components and/or a group thereof.

FIG. 1 illustrates an embodiment of an apparatus 100. The apparatus 100 may for example, be implemented as one or more processors executing a program. Other embodiments may also be implemented using one or more of other configurable or fixed logic circuitry, such as for example, (field) programmable logic arrays ((F)PLAs), (field) programmable gate arrays ((F)PGAs), graphics processor units (GPU), application-specific integrated circuits (ASICs), integrated circuits (ICs) or system-on-a-chip (SoCs). While the functionality of the apparatus may be implemented in a single hardware entity, further embodiments may likewise distribute the functionality amongst different hardware entities that can communicate with one another. The different hardware entities do furthermore not necessarily have to be of the same type. Just as an example, an embodiment of an apparatus may include a FPGA as a first hardware entity communicating with an ASIC as a second hardware entity, both entities implementing different parts of the subsequently described processing.

The apparatus 100 is effectively configured to perform an embodiment of a method 200 to process data of a radar sensor. Therefore, the functionality of the apparatus 100 and the steps of the method 200 are described jointly in the following paragraphs.

The apparatus 100 includes processing circuitry 120 configured to process target information 210 that indicates a position of a target determined by a radar measurement. The target may be any kind of living creature or object one is interested in. In many implementations, the targets of interest are human beings whose presence in an area of interest is to be determined. However, other embodiments may likewise or simultaneously be directed to the determination of the presence of animals or other non-living objects, such as for example service robots or the like. For the following discussion, it is assumed, that a position of at least one target (subsequently called a previous target) in a field of view of a radar sensor had already been determined in a previous processing step. For the subsequent discussion it is of no a-priori importance whether said previously determined previous target is identical to the presently determined target, since that association is performed by the processing steps discussed in the following. The previously determined position of the previous target will be referred to as previous position.

The target information indicating the position of the target may be generated within the processing circuitry itself or it may be received from another device, chip or memory. According to some embodiments, the apparatus optionally comprises interface circuitry (110) configured to receive the target information.

Processing circuitry 120 within apparatus 100 is configured to receive said previous position 220 of a previous target from a track data list and to then determine whether the position is within a vicinity of the previous position. The information indicating a position of a target can be stored in the track data list in arbitrary terms, for example as coordinates within a polar coordinate system or within a cartesian coordinate system. It is noted that the track data list may not only have information about the positions of individual targets but also on other properties of the targets, such as for example the strength of the echo of the target and its velocity. If the position is within the vicinity of the previous position, processing circuitry 120 replaces the previous position with the position in the track data list. Vicinity determination 230 and update of presence information may comprise multiple processing steps as illustrated in FIG. 2 or it may be performed by a single step, depending on the implementation and the representation of the presence data desired. The vicinity can be determined using an arbitrary norm, for example, the Euclidean distance. If, for example, there is only one previous position stored in the track data list and the present measurement determines two different targets, an Euclidean distance can be computed between each of the positions of the two new targets and the previous position. A user-definable distance threshold can be used to judge whether any one of the new positions is in the vicinity of the previous position or not. If only one of the positions is in the vicinity of the previous position, it is assumed that this pair of positions belongs to the same target. If both new positions should be in the vicinity of the previous position, the closer position may be chosen to belong to the same target. The flowchart in FIG. 2 illustrates multiple substeps to decide which position is in the vicinity of the previous position and to update data representing the presence of targets in an area of interest. These substeps, however, illustrate one of several possible implementations and will be explained in greater detail during the subsequent discussion.

If a position is found to be in the vicinity of the previous position, the previous position is replaced by the position within the track data list in step 240 illustrated in the flowchart.

The track data list is so updated with the present position of a target that was determined already previously, which is equivalent to an update of the track of the target. Hence, said processing can be viewed as a very efficient implementation of a tracking algorithm. These computations are not complex and can, consequently, be performed with low power devices, for example directly within a chip of a radar device. As compared to conventional approaches, no lengthy track history needs to be stored and processed to result with a track update of a target. Further, energy consuming Kalman filter calculations and trained neural network computations can be avoided.

To allow also new targets to be tracked, the processing circuitry 120 can optionally be further configured to insert the position into the track data list if the position is not within the vicinity of the previous position so as to reflect the presence of a new target.

As elaborated on before, tracking can be used for presence detection. Hence, the result of the previously described updates of the track data list can subsequently be used for presence detection.

Some possible implementations for presence detection will be described in the following paragraphs. While the positions may be determined and stored in the track data list with sufficient accuracy to perform neighbor estimation, presence detection and display may not require the accurate position of a target present but only the information indicating whether a target is present at all. Depending on the requirements, there may alternatively or additionally be the demand to store or display the position of the targets with a coarse resolution for presence monitoring. To this end, the position of the tracked targets may be associated to zones forming a partition of the field of view of the radar sensor providing the radar measurements. A zone may represent a predetermined range of positions and/or a predetermined range of angles.

FIG. 3 illustrates an exemplary implementation with positions of targets being determined in two dimensions. In a typical 2-dimensional implementation, a radar sensor 310 is capable to determine or detect targets in a field of view depending on hardware constraints. The field of view is illustrated by the delimiting lines 311*a* and 311*b* in FIG. 3. Within the field of view, a user may define an area of interest 320, illustrated by hashed lines and surrounded by dash dotted line 330 in FIG. 3. The area of interest 320 is the range of positions the user wants the presence detection to be sensitive for. That is, when a target emerges in the area of interest 320, the apparatus 100 may indicate presence by any appropriate signal or mechanism. As an example, FIG. 3 illustrates two targets 322*a* and 324*a* within the area of interest 320.

In a 2-dimensional implementation, a position may be defined by at least one range information and by at least one angle information. For example, a coordinate in the range dimension 312 (essentially being a distance from the radar sensor 310) may be used as range information and another coordinate in the angle dimension 314 (being a polar angle in a coordinate system having its center at the position of the radar sensor 310) may be used as angle information.

In the schematic illustration of FIG. 3, twelve zones are defined for presence detection by defining 4 angle intervals and 3 range intervals. For presence detection, the information as to whether at least one target is present in a zone may be sufficient. Therefore, targets 322*a* and 324*a* are associated with zones 322*b* and 324*b*, respectively. Doing so may have the advantage that only a single bit of memory is required to indicate presence in a zone, resulting with only 12 bits of data required to store the entire presence information of an embodiment using the configuration illustrated in FIG. 3. Using such a presence zone grid 340 (or a mathematical description or equivalent of the illustrated grid) may serve to significantly reduce the memory requirement as compared to conventional approaches since only a limited number of bits is required to maintain the presence information in memory.

According to some embodiments, a position is removed from the track data list if the position is outside the area of interest 320. The associated memory can so be freed and subsequent comparisons of said positions with target positions determined in the next iteration can be saved if a target moves outside the area of interest 320 a user is interested in.

Once presence is detected, apparatus 100 may use an optional output interface 130 to output presence information indicating presence within the field of view or within an area of interest 320 of the radar measurement.

Presence information 250 output or generated may for example, comprise the number of targets 254 present in the area of interest 320. Likewise, presence information may comprise a presence flag 256 indicating the presence of at least one target. Further presence information may comprise the number of active zones 252 comprising a target. The presence information may be directly derived from the presence zone grid 340, from the track data list or form a combination of both.

For example, the processing circuitry 120 may be configured to generate the presence flag 256 if the track data list comprises at least one position or if the presence zone grid 340 has at least one entry.

Using a presence zone grid 340 as illustrated in FIG. 3, one particular implementation to determine vicinity between a position and a previous position and to simultaneously update the presence data grid is illustrated by the substeps of the vicinity determination 230 in FIG. 2. This is understood to be only one of various possible implementations, while alternative implementations may have some or all of the processing steps reordered or implemented differently to achieve the same result.

In the discussed implementation of FIG. 2, the targets from the present measurement are mapped to the presence zone grid in step 231. Said mapping is performed using the position information received in 210. The presence zone grid is updated by entering the mapped targets, i.e. by marking the associated zones as having a target. This may for example, be done by setting a Bit value associated to each zone to 1.

Subsequently, the positions and the previous positions received from the track data list are associated to one another in step 232 by determining whether two positions are close to one another (in the vicinity of one another).

Based on the new positions of already present targets, the presence zone grid is updated in step 234, marking zones as no longer having a target if the previously present target was found to have moved out of the zone in step 232.

In parallel, previous targets not associated with new targets are identified in step 233 and those targets are also used to update the presence zone grid in step 235 to maintain static targets in the presence zone grid.

Subsequently, in step 236, members within the presence zone grid a user is not interested in are deleted from the presence zone grid, for example if they fell out of the area of interest defined by the user. Afterwards, the presence zone grid is updated based on the results of the new measurement and a presence flag 237 can be determined if the presence zone grid has at least one entry.

Implementing an embodiment of the previously described presence detection may enable to perform presence detection directly within a radar device since the algorithm performs only simple computations requiring little energy and since the memory requirements are also very low.

Figure 4:
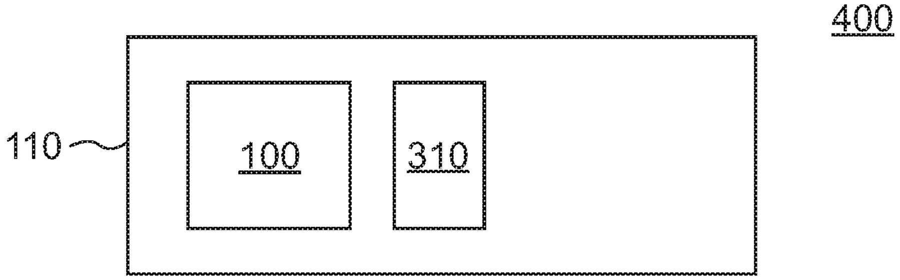
FIG. 4 a schematic illustration of a radar device.

FIG. 4 shows a schematic illustration of such a radar device 400. The radar device 400 comprises an apparatus 100 and a radar sensor 310. For the following considerations, radar sensor 310 is assumed to be a FMCW (Frequency Modulated Continuous Wave) radar generating the target information. The radar sensor may for example, operate between 30 GHz and 300 GHz, for instance at 60 GHz.

Although the apparatus 100 and the radar sensor 310 are depicted as separate blocks in FIG. 4, in a given embodiment, the apparatus may in part or in entirety be included in the radar sensor, which thus correspondingly includes all or part of the processing circuitry 120.

In case the apparatus 100 is included only part in the radar sensor 310, the apparatus may include distributed processing circuitry carrying out respective parts of the processing steps, e.g. in the form of first processing circuitry included in the radar sensor 310, and second processing circuitry external to the radar sensor and in communication with the first processing circuitry through interface circuitry 110 (FIG. 1), for instance for exchange of the target list between the first and the second processing circuitry.

In case the apparatus 100 is included in the radar sensor, the processing circuitry 120 and the radar sensor 310 may be integrated together in a single semiconductor chip, or in more than one semi-conductor chip.

In case the apparatus 100 is not included in the radar sensor 310, the processing circuitry 120 may take the form of circuitry external to the radar sensor 310, and may be in communication therewith through the interface circuitry 110.

Figure 5:
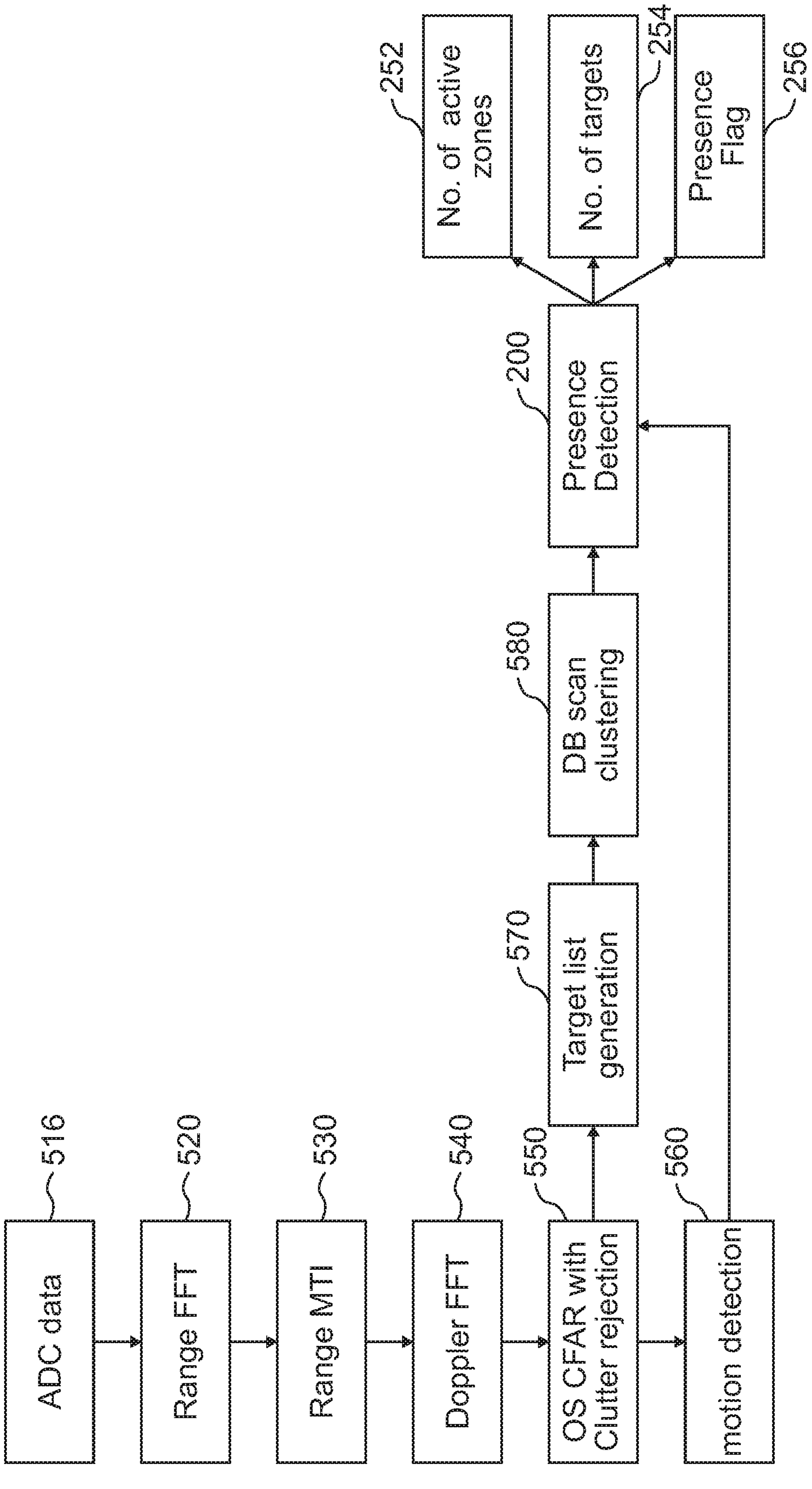
FIG. 5 a flow chart of processing steps performed in a radar device.

FIG. 5 schematically illustrates processing steps within a FMCW radar sensor to elaborate their effect on presence determination performed based on the output generated by the signal processing illustrated. FMCW radar is a type of radar that uses a continuous wave (CW) signal that is frequency modulated (FM) to detect and determine the range, velocity, and/or angle of objects. FMCW radar systems are used in applications such as automotive radar for adaptive cruise control and collision avoidance, as well as in industrial and military applications for object detection and ranging and for various other applications such as Internet-of-Things (IoT).

The principle of FMCW radar is to transmit a continuous wave signal at a frequency that is gradually increasing or decreasing over time, also known as frequency sweep or chirp. The transmitted signal reflects off an object and returns to the radar receiver, where it is mixed with a local oscillator signal to produce a beat frequency (also known as an intermediate frequency or IF) that is proportional to the range of the object.

The radar receiver then demodulates the beat frequency to extract the range information. By measuring the time delay between the transmitted and received signals, the range to the object can be calculated in a known manner.

FMCW radar can also be used to determine the velocity of an object by analyzing the Doppler shift of the returned signal. The Doppler shift is the change in frequency of the returned signal due to the motion of the object, which can be used to calculate the relative velocity of the object.

A FMCW radar system can use multiple antennas and signal processing techniques to determine the angle or direction of an object, which is known as angle of arrival (AOA) or direction of arrival (DOA) estimation. In summary FMCW radar works by transmitting a frequency-swept signal, reflecting off an object and returning to the radar receiver, where it is mixed with a local oscillator signal to produce a beat frequency that is proportional to the range of the object. The received signal is then analyzed to extract the range, velocity and/or angle of the object.

An example of an associated signal processing pipeline is given in FIG. 5. The IF signal is digitized and input as ADC data 510 into a Range FFT (Fast Fourier Transform) 520. The FFT is used to transform the IF signal from the time domain to the frequency domain. In the case of a range FFT, the signal was first mixed with a local oscillator signal to produce a beat frequency that is proportional to the range of the object. The IF signal is passed through the FFT to transform it into the frequency domain. This allows the range information to be extracted by identifying the frequency corresponding to the beat frequency.

The signal is then undergoing range MTI. MTI 530 stands for Moving Target Indicator, which is used in radar systems to improve the detection of moving targets and to reduce the effect of clutter and noise. In MTI, the signal is passed through a range gate, which is a time delay that is used to select a specific range or distance from the radar. This range gate is then moved or delayed in time to create a series of range gates at different ranges, which are then used to extract the target signal.

The target signal is extracted by subtracting the signal from one range gate from the signal from the next range gate. This process is known as range gating, and it is used to remove any signal that is not moving within the range gate. The resulting signal may then be passed through a filter, which is used to further reduce the effect of clutter and noise, and to enhance the target signal.

In summary, Range-MTI is a signal processing technique that uses range gating to extract the moving targets from the radar signal, it is used to reduce the effect of clutter and noise and to improve the detection of moving targets.

Subsequently, the signal is undergoing doppler FFT 540. Doppler FFT (Fast Fourier Transform) is used to extract velocity information from a received signal by analyzing the Doppler shift of the returned signal. The basic principle behind Doppler FFT is that when a radar signal reflects off a moving target, the frequency of the returned signal will be shifted due to the relative motion between the radar and the target. This shift in frequency, known as the Doppler shift, can be used to calculate the relative velocity of the target. To extract the Doppler shift, the received signal may first be passed through a Doppler filter, which is used to isolate the frequency components of the signal that are associated with the Doppler shift. The filtered signal is then passed through an FFT (Fast Fourier Transform) algorithm to transform the signal from the time domain to the frequency domain. In the frequency domain, the Doppler shift is represented as a shift in the frequency components of the signal. By analyzing the frequency spectrum, the velocity of the target can be calculated by identifying the frequency corresponding to the Doppler shift.

The signal is further processed by a CFAR Algorithm 550. CFAR stands for "Constant False Alarm Rate." It is a statistical algorithm that is used to detect targets. The algorithm is designed to maintain a constant false alarm rate, regardless of the background clutter present in the radar data. This is achieved by adjusting the detection threshold based on the statistical properties of the clutter. CFAR is commonly used in radar systems for air and sea surveillance, as well as for target tracking and identification. Using, for example, CFAR, the signal processing circuitry 120 may remove unwanted signal components from a range-doppler representation of a radar measurement.

Based on the output of the CFAR Algorithm, motion estimation 560 may be performed and a list of targets 570 can be generated. By motion estimation 560, the signal processing circuitry can identify whether targets in the group of targets identified so far are moving or not.

The number of possible targets from list of targets 570 can be further consolidated using a DBSCAN algorithm 580. DBSCAN (Density-Based Spatial Clustering of Applications with Noise) is a density-based clustering algorithm used to discover clusters of points in a data set that are close together and separated from points that are farther away. The basic idea behind DBSCAN is to identify clusters of points that are densely packed together while ignoring points that are sparsely distributed. The algorithm uses two parameters to define clusters: the radius of the neighborhood around each point (eps) and the minimum number of points required to form a dense region (minPts).

The algorithm starts by picking an arbitrary point from the data set, and then it finds all points within a specified radius (eps) of that point. If there are at least minPts points within that radius, a cluster is created and the algorithm continues to expand the cluster by adding all points within the radius of the points already in the cluster. This process is repeated until no more points can be added to the cluster. DBSCAN can discover clusters of arbitrary shapes, it does not require to specify the number of clusters beforehand and is able to identify noise and outliers.

In summary, the signal processing circuitry 120 of the radar device 400 identifies a group of targets in the radar measurement derives the target information for every member of the group in a target list.

The target list may then be provided as target information for the apparatus 100 or used as in input for method 200 to generating presence information as described before. Optionally, the output of the motion detection 560 may be used as an additional trigger to only start presence detection 200 once a moving target had been identified. Since the presence detection 200 relies on tracking of the targets, starting the algorithm only at the presence of moving targets is sufficient and may serve to additionally save energy by avoiding computations if only static targets are present.

Figure 6:
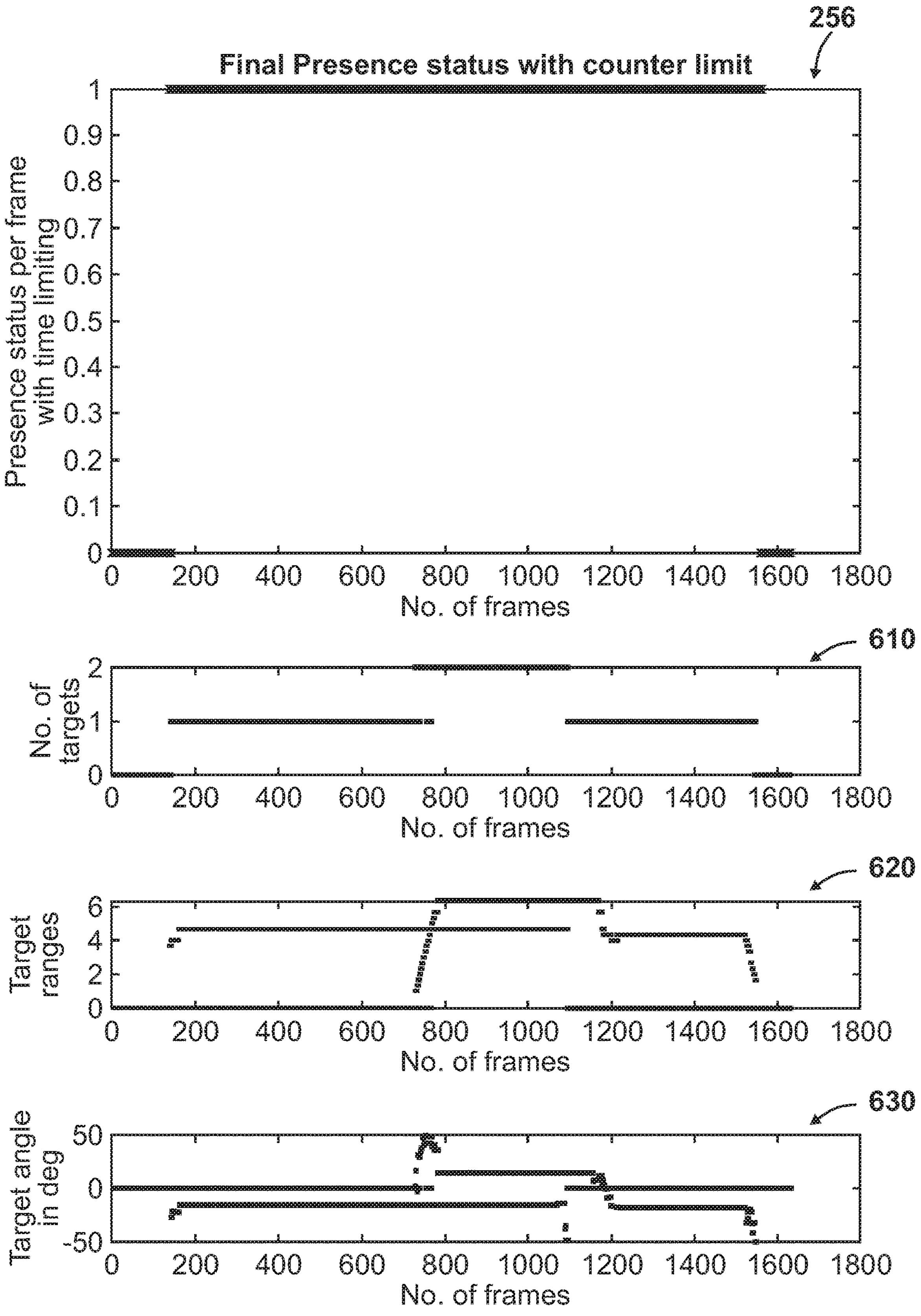
FIG. 6 an example for results of the presence detection described herein.

FIG. 6 shows an example for results of the presence detection described herein for a setup where 2 targets were subsequently entering the area of interest and leaving it again.

In all illustrations, the x-axis denotes the number of frames in the experiment, which is equivalent to the time a scene is monitored. The top graph illustrates the status of the presence flag 256.

The upper graph 610 of the bottom illustration shows the number of detected targets, while the middle graph 620 illustrates the range information determined for each target in terms of range gates. The lower graph 630 illustrates the polar angles determined for the targets in units of degree.

The described method 200 and apparatus 100 allows for the detection of dynamic motion and quasi static presence of the humans in the field of view of a radar device. In an application using a 60 GHz FMCW radar, low power consumption of less than 10 mW may be achieved, for example. Proposed implementations within a radar sensor remove clutter such as fan, cleaning robots and other vibrations from the data and provide reliable detections for presence detection. The algorithm uses a range angle grid as target information to track the detected targets which may require only few bytes (e.g. less than 64 bytes), nonetheless being able to track multiple targets in the scene using little memory. Further, the algorithm doesn't require any chirp data to be stored in the memory for micro motion detection. The algorithm doesn't require any chirp data to be stored in the memory for micro motion detection.

Further, the data acquisition intervals can be sparse. For example, a modulation scheme of only 17 chirps in a burst and running at 10 Hz update rate (measurement taken at 100 ms interval) may be sufficient. Such a modulation scheme may result in an overall power consumption of less than 6 mW using 128 samples and less than 3 mW using 64 samples for a particular ADC sampling frequency. Chirp to chirp delay is related to the sensitive of motion and may be configured as approx. 500 us.

Embodiments described may require less than 5 kB of data size memory to perform entire functionality. This leads to a possibility of direct implementation of the entire functionality in a SoC. Overall power and memory footprint is very small compared to conventional methods and thereby also reducing carbon footprint.

Embodiments as described herein may therefore, be implemented in silicon within a radar device which reduces customer price. The entire solution can be easily implemented on an embedded platform using very little memory. The method doesn't require subsequent devices or host controller to perform presence processing by transferring the data from the device to host microcontroller. This saves the data transfer interface cost for implementing the functionality within other electronic devices.

The embodiments are suitable for indoor and outdoor use cases such as smart tv, surveillance devices, smart devices such as smart, speakers, lights, doorbells, etc. Once the presence of a person in the field of view of the radar sensor can be signaled by the radar sensor itself, the host microcontroller does not need to be subsequently turned on to do the processing. The method helps to save power and cost to transfer the radar data from the device to host microcontroller.

The previously described data acquisition and presence detection may also be summarized as follows. The TX radar signals transmitted by transmitting antenna are reflected by objects in scene and received by receiving antennas. The echo received by receiving antennas are mixed with a replica of the signal transmitted by transmitting antenna using respective mixers to produce respective intermediate frequency (IF) signals xIF(t) (also known as beat signals). Respective amplifiers may be used to receive the reflected radar signals from antennas. Beat signals xIF(t) may be respectively filtered with respective low-pass filters (LPFs) and then sampled by ADC. ADC is advantageously capable of sampling the filtered beat signals xout(t) with a sampling frequency that is smaller than the frequency of the signal received by receiving antennas. FFT (Fast Fourier Transform) is applied on the ADC sampled data on each of the chirp and receivers gives range information for each frequency bin. Receiver amplitude and phase calibration could be applied if necessary at this point or it could be applied even after doppler FFT. Moving Target Indicator (MTI) is applied on chirp dimension for each range and receiver to eliminate static targets. Second FFT is applied on slow time samples (chirp dimension) on each of the receivers and range bins to generate a Range Doppler map per receiver channel. Ordered Statistics CFAR (Constant False Alarm Rate) is applied on each of the receivers followed by local maximum detection to detect the targets from a range doppler map. Clutter removal is applied. Clutter algorithm remove clutter detections coming from fan, cleaning robots and other floor vibrations and provide reliable human target detections to the presence algorithm. This will reduce false alarm detections at a huge extent. Motion event will be triggered once a motion is detected consecutively over a certain number of frames. Once the motion is identified, this will trigger presence detection algorithm. Once the motion is detected, azimuth and elevation angle of the target will be calculated for each valid detections provided after the clutter removal algorithm to generate target list. Target list may contain Range, Doppler, Azimuth and Elevation Angle of each valid detection. Clustering of the targets can be done using DBSCAN (Density-Based Spatial clustering) if required to combine certain target points from the target list. The presence detection algorithm takes target list as input for further processing. Range zones and Angle zones of interest are taken by the presence detection algorithm as an input. The algorithm uses a 'presence detection grid' of size number of range zone times number of angle zones to map the target list points. The algorithm uses 'trackdata' feature to store track list information over certain number of frames. Track list information contains range and angle of the target and its respective range and angle indices on the presence detection grid.

The aspects and features described in relation to a particular one of the previous examples may also be combined with one or more of the further examples to replace an identical or similar feature of that further example or to additionally introduce the features into the further example.

Examples may further be or relate to a (computer) program including a program code to execute one or more of the above methods when the program is executed on a computer, processor or other programmable hardware component. Thus, steps, operations or processes of different ones of the methods described above may also be executed by programmed computers, processors or other programmable hardware components. Examples may also cover program storage devices, such as digital data storage media, which are machine-, processor-or computer-readable and encode and/or contain machine-executable, processor-executable or computer-executable programs and instructions. Program storage devices may include or be digital storage devices, magnetic storage media such as magnetic disks and magnetic tapes, hard disk drives, or optically readable digital data storage media, for example. Other examples may also include computers, processors, control units, (field) programmable logic arrays ((F)PLAs), (field) programmable gate arrays ((F)PGAs), graphics processor units (GPU), application-specific integrated circuits (ASICs), integrated circuits (ICs) or system-on-a-chip (SoCs) systems programmed to execute the steps of the methods described above.

It is further understood that the disclosure of several steps, processes, operations or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process or operation may include and/or be broken up into several sub-steps, -functions, -processes or-operations.

If some aspects have been described in relation to a device or system, these aspects should also be understood as a description of the corresponding method. For example, a block, device or functional aspect of the device or system may correspond to a feature, such as a method step, of the corresponding method. Accordingly, aspects described in relation to a method should also be understood as a description of a corresponding block, a corresponding element, a property or a functional feature of a corresponding device or a corresponding system.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

The invention claimed is:

1. An apparatus comprising:

processing circuitry configured to:

receive at least one previous position of a previous target from a track data list, receive, in real time, a position of a target from a radar sensor, determine, in real time, whether the position of the target received from the radar sensor is within a vicinity of the previous position, and in response to the position of the target received from the radar sensor being within the vicinity of the previous position:

replace, in real time, the previous position with the position in the track data list with the position of the target received from the radar sensor, and associate, in real time, the position of the target received from the radar sensor with a zone of a presence zone grid comprising a plurality of zones, wherein each zone of the plurality of zones represents a predetermined range interval and a predetermined angle interval; and an output interface configured to output presence information indicating a presence within a field of view of the radar sensor, the presence information comprising a number of the plurality of zones comprising a target on the track data list.

2. The apparatus according to claim 1, wherein the processing circuitry is further configured to insert the position of the target received from the radar sensor into the track data list in response to the position of the target received from the radar sensor not being within the vicinity of the previous position.

3. The apparatus according to claim 1, wherein each of the previous positions of the previous target and the position of the target received from the radar sensor comprises at least one range information and at least one angle information.

4. The apparatus according to claim 1, wherein the processing circuitry is further configured to remove the position of the target received from the radar sensor from the track data list in response to the position of the target received from the radar sensor being outside an area of interest.

5. The apparatus according to claim 1, wherein the presence information further comprises at least one of a number of targets present, or a presence flag indicating the presence of at least one target.

6. The apparatus according to claim 5, wherein the processing circuitry is further configured to generate the presence flag in response to the track data list comprising at least one position.

7. The apparatus of claim 1, further comprising control circuitry configured to control an operation of a system based on the presence information.

8. A system, comprising:

a processor; and a memory coupled to the processor with instructions stored thereon, wherein the instructions, when executed by the processor enable the system to:

receive at least one previous position of a previous target from a track data list, receive, in real time, a position of a target from a radar sensor, determine, in real time, whether the position of the target received from the radar sensor is within a vicinity of the previous position, and in response to the position of the target received from the radar sensor being within the vicinity of the previous position:

replace, in real time, the previous position with the position in the track data list with the position of the target received from the radar sensor, and associate, in real time, the position of the target received from the radar sensor with a zone of a presence zone grid comprising a plurality of zones, wherein each zone of the plurality of zones represents a predetermined range interval and a predetermined angle interval; and an output interface configured to output presence information indicating a presence within a field of view of the radar sensor, the presence information comprising a number of the plurality of zones comprising a target on the track data list.

9. The system of claim 8, further comprising the radar sensor.

10. The system of claim 9, wherein the instructions, when executed by the processor, further enable the system to identify a group of targets in a radar measurement received from the radar sensor, and to derive target information for every member of the group of targets.

11. The system of claim 10, wherein the instructions, when executed by the processor, further enable the system to identify whether the targets in the group of targets are moving.

12. The system of claim 9, wherein the instructions, when executed by the processor, further enable the system to remove unwanted signal components from a range-doppler representation of a radar measurement received from the radar sensor.

13. The system of claim 8, further comprising control circuitry configured to control an operation of the system based on the presence information.

14. A method, comprising:

receiving, in real time, target information indicating a position of a target from a radar sensor;

receiving at least one previous position of a previous target from a track data list;

determining, in real time, that the position of the target received from the radar sensor is within a vicinity of the previous position;

in response to the position of the target received from the radar sensor being within the vicinity of the previous position:

replacing, in real time, the previous position with the position in the track data list with the position of the target received from the radar sensor, and associating, in real time, the position of the target received from the radar sensor with a zone of a presence zone grid comprising a plurality of zones, wherein each zone of the plurality of zones represents a predetermined range interval and a predetermined angle interval; and outputting, via an output interface, presence information indicating a presence within a field of view of the radar sensor, the presence information comprising a number of the plurality of zones comprising a target on the track data list.

15. The method of claim 14, further comprising inserting the position of the target received from the radar sensor into the track data list in response to the position of the target received from the radar sensor not being within the vicinity of the previous position.

16. The method of claim 14, wherein each of the previous positions of the previous target and the position of the target received from the radar sensor comprises at least one range information and at least one angle information.

17. The method of claim 14, further comprising removing the position of the target received from the radar sensor from the track data list in response to the position of the target received from the radar sensor being outside an area of interest.

18. The method of claim 14, wherein the presence information further comprises at least one of a number of targets present, or a presence flag indicating the presence of at least one target.

19. The method of claim 18, further comprising generating the presence flag in response to the track data list comprising at least one position.

20. The method of claim 14, further comprising controlling an operation of a system based on the presence information.

* * * * *